May 21, 1946.   W. P. GALLAGHER   2,400,818
ONE-WAY DRIVE DEVICE
Original Filed Nov. 3, 1941

INVENTOR.
William P. Gallagher
BY Brown, Jackson, Boettcher & Dienner
Attys.

Patented May 21, 1946

2,400,818

UNITED STATES PATENT OFFICE 2,400,818

ONE-WAY DRIVE DEVICE

William P. Gallagher, Chicago, Ill., assignor to International Register Company, Chicago, Ill., a corporation of Illinois Original application November 3, 1941, Serial No. 417,614. Divided and this application September 16, 1942, Serial No. 458,499

4 Claims. (Cl. 192—46)

The present application relates to an improved one-way drive device, and is divisional of my prior copending application on an "Adjustable time switch," Serial No. 417,614, filed November 3, 1941.

My improved one-way drive device functions as a clutch or ratchet for transmitting a one-way drive from a driving member to a driven member. This device enables the driven member to be manually rotated in an overrunning or forward direction independently of the driving member. Such devices are particularly useful in electric time switches for transmitting a drive from the synchronous electric motor to the usual switch cam or actuator which is driven by the electric motor at an accurately timed rate to open or close the electric switch at a predetermined time or times. Such one-way drive device provides for adjustment of the switch actuator by permitting the switch actuator to be manually rotated in a forward direction independently of the electric motor, but without permitting the switch actuator to be given any independent backward rotation. Such backward rotation would be hazardous in these time switches because it would be likely to injure the cams, contact springs or other switch parts.

My improved drive unit comprises a driving member provided with a plurality of driving shoulders and a driven member provided with a plurality of cooperating driven shoulders. The operating relation is such that the driven shoulders can be ratcheted in a forward direction over the driving shoulders when manually advancing the driven member forwardly relatively to the driving member, but which driven shoulders cannot be rotated backwardly independently of the driving shoulders. One of the principal features of the present invention resides in an improved numerical relationship between the driving shoulders and the driven shoulders. More specifically, the number of shoulders in the driven series is in prime relation to the number of shoulders in the driving series, i. e. the number of shoulders in one series cannot be divided evenly into the number of shoulders in the other series. For example, in the preferred construction shown, there are eight driven shoulders and nine driving shoulders, these two numbers being in prime relation to each other. By virtue of this prime relation, only one driving shoulder and one driven shoulder will be engaging at any particular time. Upon a very small forward movement of the driven member relatively to the driving member, this drive relation is immediately transferred to another drive shoulder and driven shoulder (the next in rearward sequence). The extremely small amount of angular movement that the driven member has relatively to the driving member before the drive relation is transferred back to the next driving shoulder and next driven shoulder, prevents the possibility of the driven member and switch operating cam being rotated any appreciable amount in a reverse direction. The prime number relation between the driving shoulders and the driven shoulders obtains the benefits of an extremely close arrangement of very fine teeth, but without the expense and difficulty of manufacturing such fine teeth.

Another feature of the construction resides in an improved form of spring spider having curved arms formed with driving or driven shoulders at their ends. This construction affords a relatively long length of spring arm for each shoulder within a relatively small diameter of spider.

Another feature of the invention resides in the simplicity and low cost of manufacture of the one-way drive device.

Other features, objects and advantages of the invention will appear from the following detail description of one preferred embodiment thereof. In the accompanying drawing illustrating such embodiment:

Figure 1:
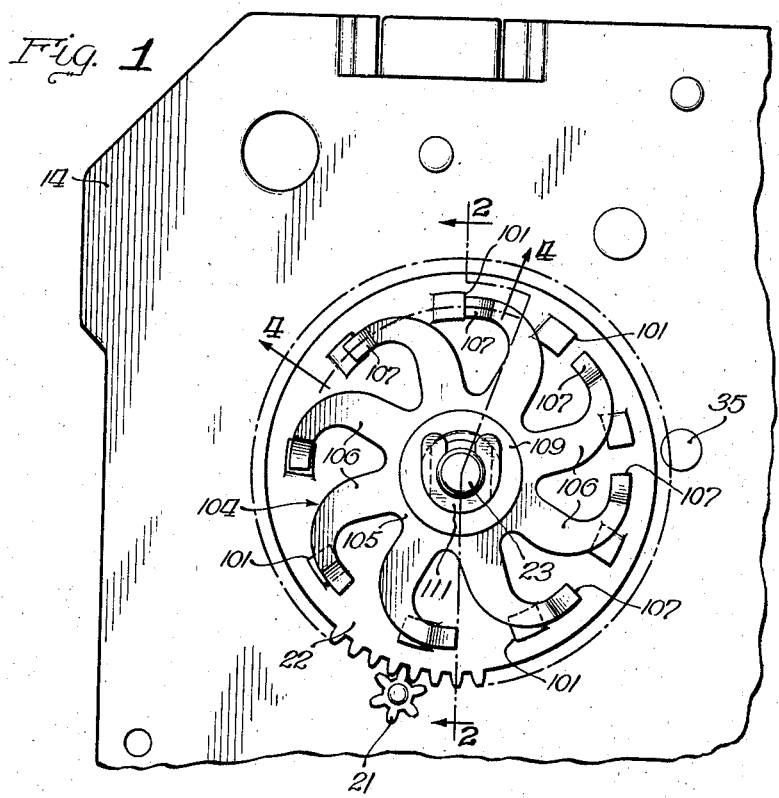
Figure 1 is an end or front elevational view of my improved drive device embodied in a driving gear.
Figure 2:
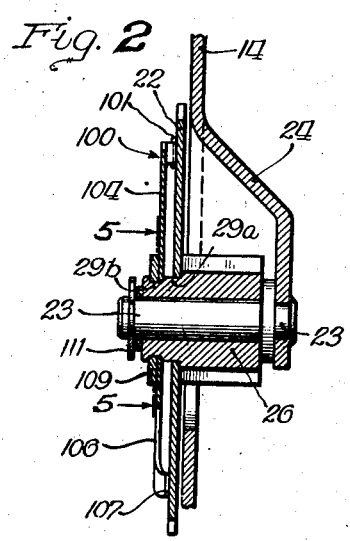
Figure 2 is a transverse sectional view taken approximately on the plane of the line 2—2 of Figure 1.
Figure 3:
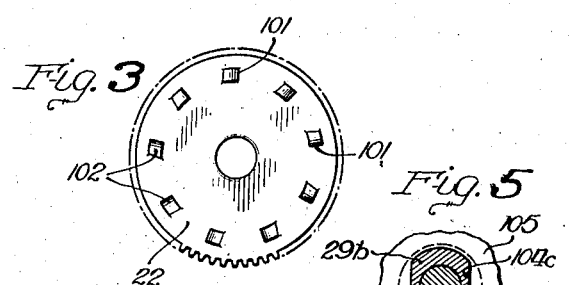
Figure 3 is an elevational view illustrating the tongues punched outwardly from the gear to form drive shoulders.
Figure 5:
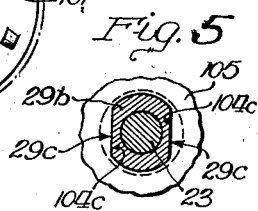
Figure 5 is a detail sectional view of the keyed mounting of the resilient clutch spider, corresponding to a section taken on the plane of the line 5—5 of Figure 2.

In the aforementioned parent application Serial No. 417,614, of which this application is a division, I have shown my improved one-way drive device interposed in the driving train between a synchronous electric motor and a switch controlling rotor which makes one complete revolution every twenty-four hours. Reference may be had to that application for the purpose of illustrating a typical adaptation of the present one-way drive device, but it will be understood that the utility of such a device is not necessarily limited to a time switch. The reference numerals appearing in Figures 1 to 5 of this application are the same as the reference numerals employed in the parent application for designating the parts of this one-way drive device.

The drive device is shown as being assembled on a mounting plate 14 constituting part of the supporting structure for the time switch. The synchronous electric motor is operatively connected to drive the small pinion 21 at a timed rate. This pinion meshes with a large spur gear 22 which constitutes the driving element of the one-way drive device. The device has rotatable mounting on a stationary bearing stud 23 which has one end riveted or staked to a supporting lug or bracket 24 which is punched laterally from the body of the mounting plate 14. The large driving gear 22 is mounted on a reduced annular shoulder 29a extending from one end of a pinion 26 which is journaled for rotation on the bearing stud 23. The large driving gear 22 is capable of rotative movement relatively to the pinion 26, this pinion constituting part of the driven member of the one-way drive device. Rotary motion is transmitted from the pinion 26 to the switch operating rotor through another gear, not shown.

Figure 4:
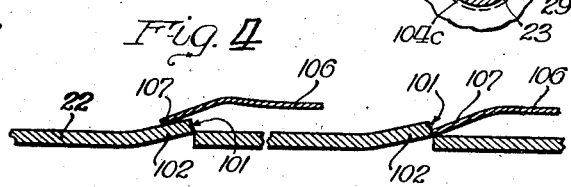
Figure 4 is a developed sectional view taken along the curved section plane 4—4 of Figure 1.

The large driving gear 22 is formed with an annular series of driving shoulders 101 projecting up laterally from the body of the gear. As shown in Figure 4, these shoulders are preferably formed by punching tongues 102 rearwardly from the body of the gear, the free ends of the tongues facing in the normal, clockwise direction of rotation of the driving gear 22.

The driven element of the one-way drive device is in the form of a spider 104 comprising a hub portion 105 from which radiate a plurality of evenly spaced spring arms 106. These spring arms are preferably curved in the approximate S-formation shown so as to be of longer length for increased resiliency, but without increasing the overall diameter of the ratchet clutch assembly. The central portion of the spider 104 is spaced slightly from the large drive gear 22, but the tip ends 107 of the spider arms are sloped toward said drive gear so as to bear constantly against the surface of the gear and to be engaged by the driving shoulders 101.

The pinion 26 is formed with a further reduced extension 29b extending beyond the reduced annular shoulder 29a. The driven spider 104 is mounted on this smaller extension 29b of the bearing hub 29a, the shoulder at the inner end of such outer extension maintaining the hub of the spider spaced away from the surface of the drive gear 22. Splayed or other like driving surfaces 29c on the outer bearing extension 29b (Figure 5) engage corresponding driving surfaces 104c formed in the hub of the spider 104. A retaining washer 109 fits against the outer side of the spider, and the end of the bearing extension 29b is peened over the outer side of this retaining washer. A U-shaped retainer clip or washer 111 has snap engagement in an annular groove formed in the end portion of the bearing stud 23 for retaining the above described assembly on the bearing stud.

The small spur pinion 21 driven by the electric motor will impart a continuous, time driven rotation to the large driving gear 22 at all times. In Figure 1, this direction of rotation is clockwise, and it will hence be seen that the driving shoulders 101 projecting laterally from this gear transmit the driving torque of the gear to the tip ends 107 of the spider 104. This establishes a one-way driving relation wherein the gear 22 positively drives the spider 104 in a clockwise direction, while still enabling the spider to be advanced in a forward or clockwise direction relatively to the gear, but not permitting the spider to be rotated backwardly relatively to the gear.

There are preferably a relatively large number of driving shoulders 101 and a relatively large number of driven shoulders 107, and the number of shoulders in one series is in prime relation to the number of shoulders in the other series. For example, in the preferred construction shown, there are nine driving shoulders 101 and eight driven shoulders 107, these two numbers being in prime relation to each other. By virtue of this prime relation, wherein one number of shoulders cannot be divided evenly into the other number of shoulders, only one driving shoulder and one driven shoulder will be engaging at any particular time. Upon a very small advancing movement of the spider relatively to the drive gear, this drive relation is immediately transferred to another drive shoulder and driven shoulder (the next in rearward sequence). The very small amount of angular movement that the spider has, relatively to the drive gear, before the drive relation is transferred back to the next driving shoulder and driven shoulder, prevents the possibility of the driven gear 26 and switch operating cam being rotated any appreciable amount in a reverse direction. That is to say, all adjustments of the switch operating cam and its time driven dial are thereby compelled to occur in a clockwise direction of rotation so that there is no possibility of the switch operating cams, contact springs or other parts being damaged in attempting reverse rotation accidentally or otherwise. The gear reduction from the armature of the electric motor to the pinion 21 is of such design or of such magnitude that the motor cannot be driven in the reverse direction by any manual force capable of being exerted on the time driven dial and switch cam and thence back to the pinion 26.

The prime number relation between the driving shoulders 101 and the driven shoulders 107 establishes an extreme fineness of action without the expense and difficulty of forming extremely fine ratchet teeth. The provision of a separate spring arm 106 for each driven shoulder or pawl 107 cooperates with the prime number relation because each driven shoulder 107 is thereby enabled to flex in an axial direction relatively to every other driven shoulder 107, whereby to maintain constancy of contact of every driven shoulder with the face of the gear 22 and with its driving shoulders 101, even though the different driven shoulders are each riding at different heights on the gear and its driving shoulders. It will also be observed that the curved formation of the spring arms 106 results in a relatively long length of spring arm within a relatively small size of spider.

While I have illustrated and described what I regard to be the preferred embodiment of my invention, nevertheless it will be understood that such is merely exemplary and that numerous modifications and rearrangements may be made therein without departing from the essence of the invention.

I claim:

1. A one-way drive device comprising a driving member and a driven member, one of said members comprising a disc having an annular series of shoulders punched upwardly therefrom, and the other of said members comprising a spider having an annular series of spring arms formed with shoulders at their ends adapted to engage with said first series of shoulders on said disc, said two series of shoulders establishing a positive driving relation in one direction of rotation and a ratcheting relation in the other direction of rotation, said two series of shoulders being in prime numerical relation to each other to minimize counter-rotation of said driven member before the one-way driving relation is established between said members, each of said spring arms extending outwardly substantially radially from the center of said spider whereby each spring arm is capable of free flexing movement equal to the depth of the shoulders on said disc without compelling corresponding movement of any of the other arms of said spider.

2. A continuously engaging one-way drive device comprising a driving member and a driven member, said driving member comprising a gear wheel having an annular series of driving shoulders punched upwardly therefrom, said driven member comprising a spider having an annular series of spring arms formed with driven shoulders at their ends adapted to engage with said driving shoulders on said gear wheel, said gear wheel comprising a hub and said spider being mounted on said hub to be permanently maintained at a fixed axial spacing from the side of said gear wheel with said spring arms bearing constantly against the side of said gear wheel, said driving and driven shoulders establishing at all times a positive driving relation in one direction of rotation and a ratcheting relation in the other direction of rotation, there being a larger number of shoulders on said disc than on said spider and said numbers being in prime relation to each other to minimize counter-rotation of said driven member before the one-way driving relation is established between said members, each of said spring arms extending outwardly substantially radially from the center of said spider and then curving rearwardly in a trailing direction with the driven shoulder formed across the trailing end, whereby each spring arm is capable of free flexing movement equal to the depth of said driving shoulders without compelling corresponding movement of any of the other arms of said spider.

3. A continuously engaging one-way drive device comprising a driving member and a driven member, one of said members comprising a disc having an annular series of motion transmitting shoulders carried thereby, and the other of said members comprising a spider having an annular series of integrally joined laterally flexing spring arms formed with motion transmitting shoulders adapted to engage with the motion transmitting shoulders carried by said disc, said driving and driven members being permanently maintained at a fixed axial spacing with said spring arms bearing constantly on said disc, said two series of shoulders establishing at all times a positive driving relation in one direction of rotation and a ratcheting relation in the other direction of rotation, said two series of shoulders being in prime numerical relation to each other to minimize counter-rotation of said driven member before the one-way driving relation is established between said members, each of said spring arms extending outwardly substantially radially from the center of said spider and being of diminishing taper toward the outer end thereof whereby to produce a relatively long length of spring arm capable of free flexing movement equal to the depth of the motion transmitting shoulders on said disc without compelling corresponding movement of the other arms on said spider.

4. A continuously engaging one-way drive device comprising a driving member and a driven member, one of said members comprising a disc having an annular series of motion transmitting shoulders carried thereby, and the other of said members comprising a spider having an annular series of laterally flexing spring arms formed with motion transmitting shoulders adapted to engage with said first series of shoulders carried by said disc, said driving and driven members being permanently maintained at a fixed axial spacing with said spring arms bearing constantly on said disc, said two series of shoulders establishing at all times a positive driving relation in one direction of rotation and a ratcheting relation in the other direction of rotation, said two series of shoulders being in prime numerical relation to each other to minimize counter-rotation of said driven member before the one-way driving relation is established between said members, each of said spring arms extending outwardly substantially radially from the center of said spider whereby to produce a relatively long length of spring arm capable of free flexing movement equal to the depth of the motion transmitting shoulders on said disc without compelling corresponding flexing movement of any of the other arms of said spider.

WILLIAM P. GALLAGHER.